INVENTOR.
DIRK MUILWIJK
BY
[signature]
AGENT

INVENTOR.
DIRK MUILWIJK
BY
[signature]
AGENT

INVENTOR.
DIRK MUILWIJK
BY
Frank R. Trifari
AGENT

United States Patent Office 3,535,636
Patented Oct. 20, 1970

1 2

3,535,636

TRANSCEIVER WHICH TESTS BOTH TRANSMITTING AND RECEIVING FREQUENCIES BEFORE MAKING A CALL

Dirk Muilwijk, Hilversum, Netherlands, assignor, by mesne assignments, to U.S. Philips Corporation, New York, N.Y., a corporation of Delaware Filed Nov. 30, 1967, Ser. No. 686,975
Claims priority, application Netherlands, Dec. 13, 1966, 6617461
Int. Cl. H04b *1/50, 1/70*
U.S. Cl. 325—25 12 Claims

ABSTRACT OF THE DISCLOSURE

A radio intercommunication system in which transceivers are adapted to transmit and receive only on common selected channels in one or more frequency bands. The receivers include means for scanning the selected frequencies to find free channels, and for controlling their respective transmitters to occupy a free channel. Each transceiver has a characteristic address, so that the receiver stops its scanning upon receiving the characteristic address.

The invention relates to an intercommunication system for radio communication between equivalent communication stations without the need for using a central station, in which each communication station comprises a transceiver device suitable for the communication inside a frequency band common to all stations.

Such systems using pulse transmission are known. They have the disadvantage that the reception of a station may be disturbed by a station transmitting substantially the same pulse frequency as the station transmitting to the first-mentioned station. A further disadvantage is that when the transmitted pulse signal reaches the receiving station on different paths a considerable disturbance is involved.

The invention has for its object to provide an intercommunication system of the kind set forth employing different frequency channels.

The intercommunication system according to the invention is characterized in that each station taking part in the communication transmits a carrier wave through one of the predetermined carrier wave channels lying in the common frequency band, said carrier having a carrier frequency characteristic of the receiving frequency of the station concerned, in that each communication station comprises a device for finding a free carrier-wave channel and a control-device for occupying a free carrier-wave channel by switching on the transmitter, a free carrier-wave channel being coupled only when the carrier-wave channel characterizing the frequency of the free carrier-wave channel as the receiving frequency is also free.

Figure 1:
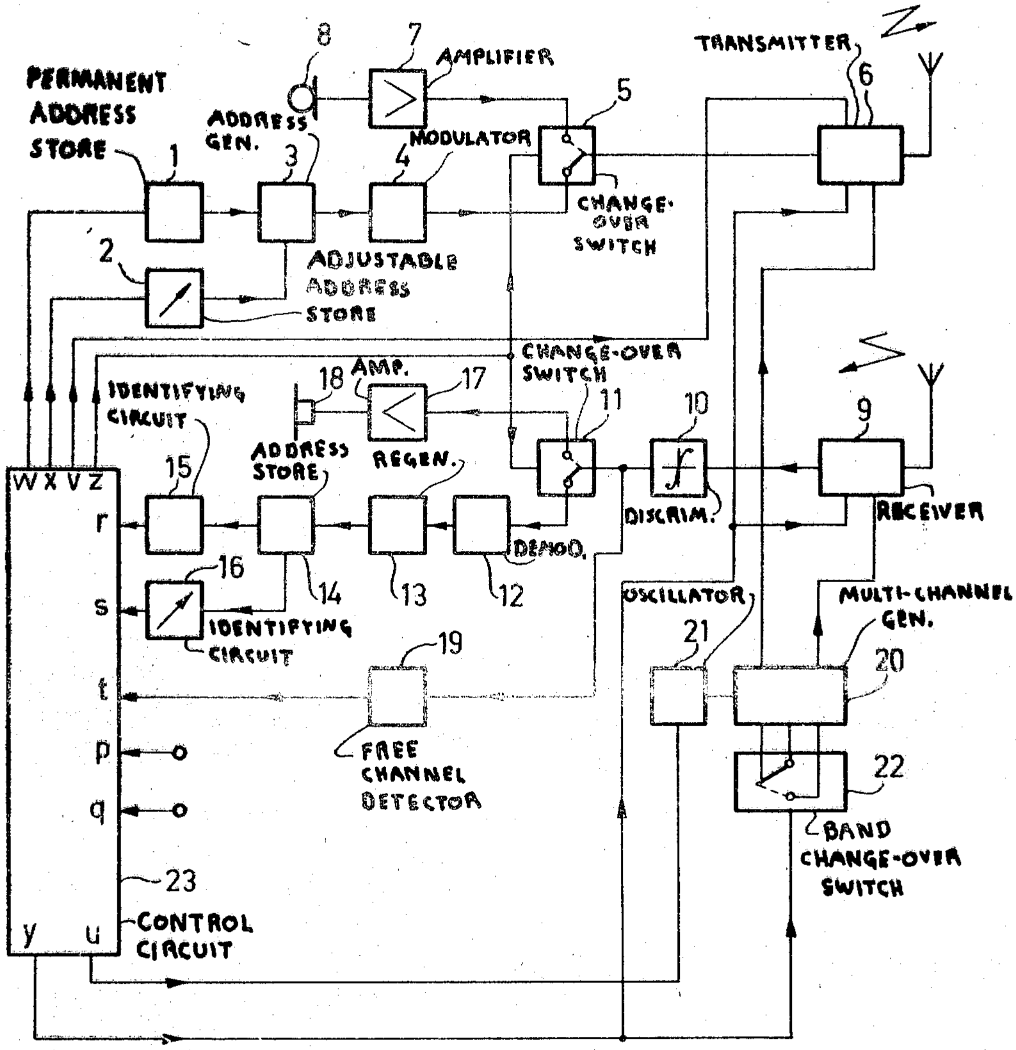
Figure 2:
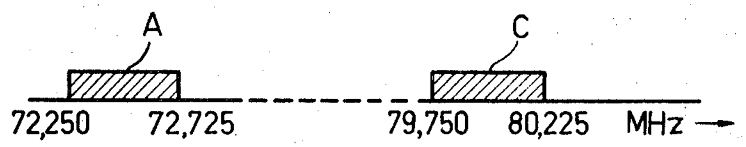
Figure 4:
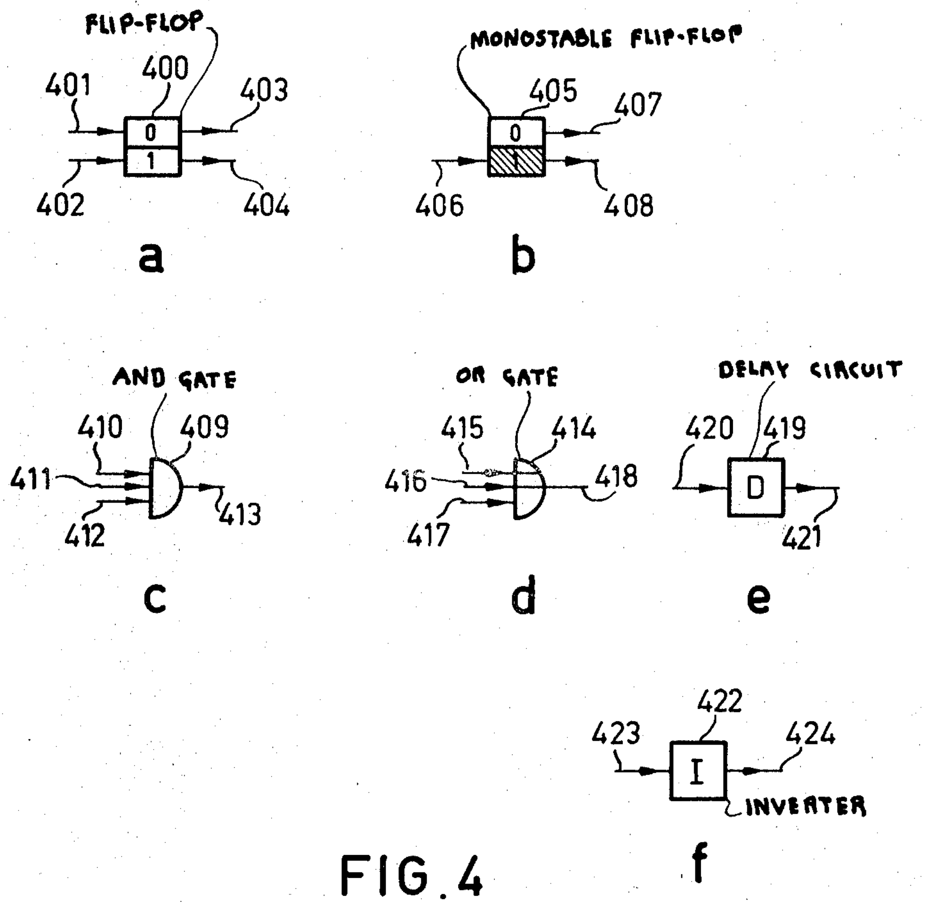
Figure 3:
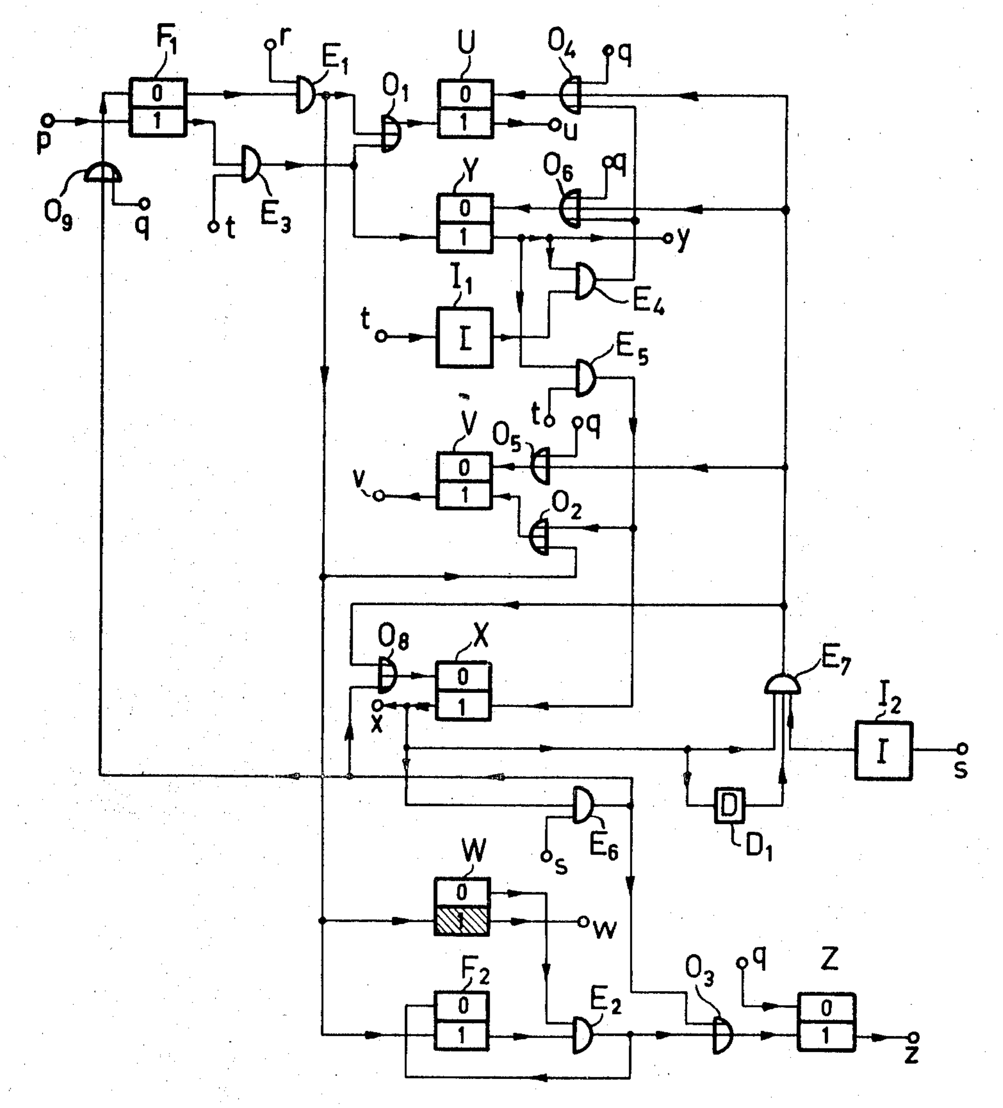

The invention will be described more fully with reference to the figures, of which FIG. 1 shows the block circuit diagram of an intercommunication station, FIG. 2 illustrates the position of a frequency band, FIG. 3 shows one embodiment of the control-device of FIG. 1 and FIG. 4 illustrates the symbols employed.

The intercommunication station, the block diagram of which is shown in FIG. 1, comprises a tranceiver suitable for duplex communication through a duplex channel that can be selected from a plurality of duplex channels. For the communication between the stations of the communication system two common frequency bands are available. In each frequency band a plurality of carrier frequencies are fixed previously. The transmitter carrier wave of each station can be adjusted to anyone of the predetermined carrier frequencies. With one carrier frequency in one frequency band is unambiguously associated one carrier frequency of the other frequency band. Each pair of frequencies formed by the frequency of one frequency band and the associated frequency of the other frequency band constitutes a duplex channel. When the transmitter is tuned to one frequency of the duplex channel, the receiver is automatically tuned to the other frequency of the duplex channel. The calls made by one station to other stations are invariably transmitted in the same frequency band, which is the same for all stations. This frequency band is briefly termed the call band. The carrier frequencies predetermined in this frequency band form different call channels. A calling station can transmit through each of these call channels its calls. The reply to incoming calls is invariably made in the other frequency band, which is termed the reply band. The predetermined carrier frequencies of this frequency band form different reply channels. A station called answers an incoming call through the reply channel associated with the call channel through which the call is received. The call channel and the associated reply channel together form a duplex channel for bilateral communication between the calling station and the station called.

FIG. 2 shows an example of the position of the call band C and the reply band A in the frequency spectrum. In each band 20 carrier frequencies may be fixed with a frequency distance of 25 kc./s. The carrier frequencies of the two frequency bands are associated so that the distance between the two frequencies is the same for all duplex channels. In this example this frequency interval is 7.5 mc./s.

Each communication station has a number characteristic thereof. This number is hereinafter termed the address. A communication station wanting to call a further station modulates the transmitter carrier wave by the address information in a given code. The address information may be coded in different ways. An audiofrequency code may be chosen. In communication systems comprising a great number of stations it is advantageous to employ a binary code, in which case a great number of different numbers can be formed by a small number of code elements. In the present example the last-mentioned method is used. The transmitter carrier is modulated by the frequency-modulation method.

The transmitting part comprises a permanent address store 1 in which its own address is stored and an adjustable address store 2 in which the address of the station to be called is stored. An address generator 3 is connected to said stores. The output signal of the address generator is a binary signal. This signal is modulated in a subcarrier modulator 4 on a subcarrier and applied through a speech-code change-over device 5 to the transmitter 6. In the speech position of the change-over device 5 the signals of the microphone 8, amplified by the amplifier 7, are applied to the transmitter 6.

The receiving part comprises a receiver 9 having two cascade-connected mixing stages having a first intermediate frequency of, for example, 10.7 mc./s. and a second intermediate frequency of, for example, 545 kc./s. These mixing stages are not shown in detail in the figures. At the output of the receiver 9 appears a frequency-modulated signal having an intermediate frequency of 545 kc./s. This signal is applied to a frequency discriminator 10, the output signal of which is applied through the speech-code change-over device 11 to the subcarrier demodulator 12. The output signal thereof is regenerated by the regenerator 13 and then applied to the address store 14. To this store are connected a permanent-address identifying circuit 15 for the address of the station proper and an adjustable address identifying circuit 16 for the address of the station called. In the speech position of the change-over device 11 the output signal of the frequency discriminator 10 is applied via the amplifier 17 to the telephone 18. To the output of the frequency discriminator 10 is connected a free-channel detector 19. A channel is considered to be free, when the output level of the frequency discriminator in the frequency spectrum above 3 kc./s. exceeds a given preadjusted reference level. The frequency spectrum of the speech and code signals is limited to about 3 kc./s. The presence of a given output level in the frequency spectrum above 3 kc./s. is indicative of the presence of noise. In the case of an occupied channel this noise is suppressed in the limiter of the FM-receiver so that the presence of noise constitutes an appropriate criterion of the non-occupied state of a channel. To the transmitter 6 and the receiver 9 is connected a multi-channel generator 20. In the rest position of the station the transmitter is switched off and tuned to the reply band, whereas the receiver is permanently switcehd on and tuned to the call band. The multi-channel generator supplies to the modulator of the transmitter 6 normally a carrier wave whose frequency is equal to that of one of the pre-determined reply channels. With this reply channel corresponds a given call channel. To the first mixing stage of the receiver 9 is applied a carrier wave whose frequency is 10.7 mc./s. lower than that of the call channel. To the multi-channel generator 20 is connected a selecting oscillator 21 which increases the carrier frequencies normally in a given rhythm by steps of 25 kc./s. With each increase of the frequency the receiver is tuned to a call channel having a higher position in the call band. The transmitter is simultaneously tuned to the corresponding reply channel. After the receiver has been tuned to the call channel of the highest frequency, the multi-channel generator switches the receiver back to the call channel of the lowest frequency. At the same time the transmitter is switched back to the reply channel of the lowest frequency. Then the receiver is again tuned in order of succession to all call channels and the transmitter to the corresponding reply channels. The cyclic tuning to the various call channels serves for receiving the calls coming in through said channels. Each call consists of a binary coded address and a preceding binary coded synchronising word. The synchronising word is formed so that it can be easily recognized. This synchronising word serves for the unambiguous identification of the begnning of an addres sand to synchronise the regenerator 13. When a call is received during tuning to a call channel, the code elements of the address are collected in the address store 14. After the full reception the address is compared by the permanent-address identifying circuit 15 with the address of the communication station concenned. If the received address does not correspond with the fixed address of the station no change occurs and the selection of call channels continues. If the permanent-address identifying circuit 15 recognises the address proper of the communication station, the receiver is locked on the relevant call channel. At the same time the transmitter is locked on the corresponding reply channel. During the selection of the call channels the transmitter is switched off. After the recognition of the address proper the transmitter is switched on and said address is transmitted through the reply channel. Then the speech code changeover devices 5 and 11 are changed over from the code position to the speech position. The communication station is then in the state in which speech transmission is possible with the calling station in duplex communication.

For calls emanating from a communication station use is made of a band change-over device 22, connected to the multi-channel generator 20. When the band change-over device is switched on, the frequency of the carrier applied to the transmitter 6 is raised by 7.5 mc./s. and the frequency of the carrier supplied to the receiver 9 is decreased by 7.5 mc./s. Simultaneously with the change-over of the band change-over device 22 the tuning of the transmitter 6 is passed over to the call band and the tuning of the receiver 9 is passed over to the reply band. The value of 7.5 mc./s. is the frequency interval between a reply channel and the corresponding call channel. At the instant of change-over the receiver is tuned to a given call channel and the transmitter is tuned to the corresponding reply channel. By the change-over the transmitter is tuned to the call channel and the receiver to the corresponding reply channel.

When a call has to be sent to a further station, first the address of this station is stored in the adjustable address store 2 and in the adjustable address identifying circuit 16. The selection of the call channels is continued, the difference being, however, that a free channel has to be found. This finding is performed by the free-channel detector 19. When a free call channel is detected, the search of the call channels is stopped. The receiver is switched over to the corresponding reply channel. At the same time the transmitter is switched over to the free call channel. After this change-over it is tested whether the reply channel is free. This test is also performed by the free-channel detector 19. If the reply channel is not free, the call channel cannot be used, since a transmission through this channel would disturb the receiver or the communication station transmitting through the reply channel. If the reply channel is occupied, the receiver is tuned back to the call channel. Then the search of the call channels is resumed until again a free call channel is found, after which the reply channel corresponding thereto is tested. The situation in which a call channel is free and the corresponding reply channel is occupied may occur when a communication station located within the receiving range of the station concerned transmits on the frequency of the reply channel to a station located beyond the receiving range. The latter station transmits on the frequency of the call channel. Since this station is located beyond the receiving range, the call channel is detected as being free. If the reply channel corresponding to a free call channel is not occupied, the transmitter is switched on and the address of the desired station is transmitted through the call channel. If a reply is received from the desired communication station through the reply channel within a predetermined time, the transmission of the address ceases. As stated above, the reply of the called station consists in the transmission of its own address through the reply channel. An address entering the calling station through the reply channel is collected in the address store 14. After the complete reception the address is compared by the adjustable address identifying circuit 16 with the desired address. In the event of correspondence the speech-code change-over devices 5 and 11 are switched over from the code position to the speech position. The calling station is then in the state in which speech communication in duplex is possible with the called station.

There is a possibility that no reply is received from the called station. This may be due to various reasons. One reason may be that the called station is occupied and furthermore it may be out of operation or it may be located beyond the transmission range of the calling station. A further reason may be that at the place of the called station the call channel is occupied by a further station located inside the receiving range of the called station but beyond the receiving range of the calling station. The reception of the call by the called station is then disturbed by the transmission of said further station. As a result the call is mutilated and can therefore not be identified. If within the predetermined time after the transmission of a call no reply is received, a free call channel and a corresponding free reply channel are searched and the call is retransmitted.

The possibility of success of finding a free, operative station within the transmitting range of the calling station depends upon the distribution of the free call channels in the call band at the place of the calling station and at the place of the called station. If no call channel is free neither for the calling station nor for the called station, the call remains unsuccessful. An improvement may be obtained by hunting over the call band to find a free call channel from a predetermined call channel which is the same for all stations. This channel may be the call channel having the lowest frequency. The call band is then occupied from below. The free call channels are then always located in the upper part of the call band. Thus the possibility of finding a free call channel after one or more repetitions of the call, both for the calling station and the called station, is much greater than in the case of an arbitrary distribution of the free call channels.

The principle in occupying a call channel is that existing communications should not be disturbed. In duplex communication the call channel and the corresponding reply channel are simultaneously occupied by the two intercommunicating stations. In semi-duplex communication the two stations are alternately occupied. In simplex communication only one channel is employed, which is alternatively occupied by one station and the other. By a slight modification, if desired, semi-duplex communication or simplex communication may be used in the present intercommunication system. The modification consists in that the station switched on to reception switches on its transmitter periodically. Thus the transmitting channel is periodically occupied. In simplex communication the transmitting channel and the receiving channel coincide in frequency so that also the receiving channel is occupied. In semi-duplex communication the two channels are tested with respect to their free-busy states so that by occupying the transmitting channel the receiving channel is automatically occupied as well.

The permanent-address identifying circuit 15, the adjustable-address identifying circuit 16 and the free-channel detector 19 apply a signal *r*, *s* and *t* respectively to a control-device 23. Moreover, the signals *p* and *q* are applied to the control-device. As a reply to these input signals the control-device provides the output signals *u*, *v*, *w*, *x*, *y* and *z*. These signals are applied to the hunting oscillator 21, the transmitter 6, the permanent-address store 1, the adjustable-address store 2, the band change-over circuit 22 and the transmitter 6 and the receiver 9, the speech-code change-over circuits 5 and 11 respectively. Said signals have a high level or a low level. Each signal represents a binary variable of the value "0" or "1." The expression: "signal *a* has a level representing the value "1" " is abbreviated hereinatfer to $a=1$ or signal $a=$"1". The aforesaid signals, when changing over from "0" to "1," have the following significance:

*p*—outgoing call.
*q*—resetting to the rest position.
*r*—the station's address proper identified.
*s*—adjusted address identified.
*t*—channel free.
*u*—stopping hunting oscillator.
*v*—starting of transmitter.
*w*—transmission of the station's own address.
*x*—transmission of adjusted address.
*y*—tuning of transmitter to call band, tuning of receiver to the reply band and switching on of the band change-over circuit.
*z*—changing over to speech.

A possible embodiment of the control-device is shown in FIG. 3. FIG. 4 shows the symbols employed. FIG. 4*a* shows a flip-flop 400 having two inputs 401 and 402 and two outputs 403 and 404. When the signal at input 401 changes over from" 0" to "1," the flip-flop changes over to the state "0" and the signal at the output 403 becomes "1." When the signal at the input 402 changes over from "0" to "1," the flip-flop passes to the state "1" and the signal at the output 404 becomes "1." At the same time the signal at the output 403 becomes "0." The input 401 is termed the resetting input and the input 402 is termed the setting input. When the output of the flip-flop is not further specified, the output 404 is meant. The output 403 is termed the inverse output. FIG. 4*b* shows a mono table flip-flop 405 having the input 406 and the outputs 407 and 408. When the signal at the input 406 passes from "0" to "1," the flip-flop changes over to the state "1." After a given period of time the flip-flop changes automatically back to the state "0." FIG. 4*c* shows an and-gate 409, having inputs 410, 411 and 412 and an output 413. The signal at the output 413 is "1" only when all input signals are "1." FIG. 4*d* shows an or-gate 414, having the inputs 415, 416 and 417 and the output 418. The signal at the output 418 is "1" when at least one of the input signals is "1." FIG. 4*e* shows a delay circuit 419 having an input 420 and an output 421. When the input signal passes from "0" to "1," the output signal passes a given period of time later from "0" to "1." When the input signal passes from "1" to "0," the output signal passes without delay from "1" to "0." FIG. 4*f* shows an inverting circuit 422 having an input 423 and an output 424. When the input signal is "1," the output signal is "0" and conversely.

The control-device 23 (FIG. 3) comprises a flip-flop for each output signal, which flip-flops are designated by the corresponding capital letter. In the rest position all flip-flops are in the state "0." The signal *u* is "0" so that the hunting oscillator 21 is released. Thus the call channels are hunted in order of succession to find calls. When the signal *r* passes from "0" to "1," the output signal of the and-gate $E_1$ also passes from "0" to "1." This output signal is applied through the or-gate $O_1$ to the setting input of flip-flop U, through the or-gate $O_2$ to the setting input of flip-flop V, to the input of flip-flop W and to the setting input of flip-flop $F_2$. As a result these flip-flops change over to the state "1." The signal *u* becomes "1" and stops the hunting oscillator 21. The signal *v* becomes "1" and switches on the transmitter 6. The signal *w* becomes "1" and actuates the transmission of the station's own address from the permanent-address store 1 to the address generator 3. The address generator transmits the station's own address as long as the signal *w* is "1." After a given period of time the flip-flop W changes back into the state "0." Thus the transmission of the station's own address ceases. The and-gate $E_2$ is connected to the inverse output of flip-flop W and the output of flip-flop $F_2$. The output signal of the and-gate $E_2$ passes from "0" to "1," when the flip-flop W passes back to the state "0." This output signal is applied through the or-gate $O_3$ to the setting input of flip-flop Z and to the resetting input of flip-flop $F_2$. Thus the flip-flop Z changes over to the state "1" and the flip-flop $F_2$ to the state "0." The signal *z* becomes "1" and changes over the speech-code change-over circuits 5 and 11 to the speech position. After the termination of the call the signal *q* changes from "0" to "1." This signal is fed back through the or-gate $O_4$ to the resetting input of flip-flop U, through the or-gate $O_5$ to the resetting input of flip-flop V and to the resetting input of flip-flop Z. Thus these flip-flops change over to the state "0." The signal *u* becomes "0" and releases the hunting oscillator. The signal *v* becomes "0" and switches off the transmitter. The signal *z* becomes "0" and switches back the speech-code change-over circuits to the code position. Thus hunting over the call channels to find calls is resumed.

The signal *p* is applied to the setting input of flip-flop $F_1$. When the signal *p* changes over from "0" to "1," the flip-flop $F_1$ passes to the state "1." The signal at the output of flip-flop $F_1$ and the signal *t* are applied to the and-gate $E_3$. The output signal of the and-gate $E_3$ passes from "0" to "1," when the flip-flop $F_1$ is in the state "1" and the signal *t* changes over from "0" to "1." The output signal of the and-gate $E_3$ is applied through the or-gate $O_1$ to the setting input of flip-flop U and to the setting input of flip-flop *y*. Thus these flip-flops change over to the state "1." The signal *u* becomes "1" and stops the hunting oscillator. The signal $y$ becomes "1" so that the transmitter is tuned to the call channel and the receiver to the reply channel. The signal $t$ is applied through the inverting circuit $I_1$, together with the output signal of the flip-flop Y to the and-gate $E_4$. When the signal $t$ passes from "1" to "0," after the change-over of flip-flop Y the output signal of the and-gate $E_4$ passes from "0" to "1." This signal is applied through the or-gate $O_4$ to the resetting input of flip-flop U and through the or-gate $O_6$ to the resetting input of flip-flop Y. Thus these flip-flops change over to the state "0." The signal $u$ becomes "0" and releases the hunting oscillator. The signal $y$ becomes "0" and switches back the transmitter to the reply channel and the receiver to the call channel. In this way the hunting of the call band to find a free call channel is resumed. The output signal of flip-flop Y, together with the signal $t$ is applied to the and-gate $E_5$. When after the change-over of flip-flop Y to the state "1" the signal $t$ remains "1," the output signal of the and-gate $E_5$ becomes "1." This signal is applied through the or-gate $O_2$ to the resetting input of flip-flop V and to the setting input of flip-flop X. These flip-flops thus pass to the state "1." The signal $v$ becomes "1" and switches on the transmitter. The signal $x$ becomes "1" and actuates the transmission of the address stored in the adjustable address store 2 to the address generator 3. The address generator transmits the adjusted address as long as the signal $x$ remains "1." The output signal of flip-flop X, together with the signal $s$, is applied to the and-gate $E_6$. When the signal $s$ becomes "1," the output signal of the and-gate $E_6$ changes over from "0" to "1." This signal is applied through the or-gate $O_3$ to the setting input of flip-flop Z, through the or-gate $O_9$ to the resetting input of flip-flop $E_1$ and through the or-gate $O_8$ to the resetting input of flip-flop X. Thus the flip-flop Z changes over to the state "1" and the flip-flops X and $F_1$ pass to the state $O_1$. The signal $z$ becomes "1" and changes over the speech-code change-over circuits 5 and 11 to the speech position. The signal $x$ becomes "0" so that the transmission of the adjusted address is terminated.

The output signal of flip-flop X is applied on the one hand directly and on the other hand through the delay circuit D and furthermore together with the signal $s$ inverted by the inverting circuit $I_2$ to the and-gate $E_7$. When the signal $s$ does not become "1" within the delay time of the delay circuit $D_1$, the output signal of the and-gate $E_7$ changes from "0" to "1" at the end of this delay period. This signal is applied through the or-gate $O_8$ to the resetting input of flip-flop X, through the or-gate $O_5$ to the resetting input of flip-flop V, through the or-gate $O_6$ to the resetting input of flip-flop Y and through the or-gate $O_4$ to the resetting input of flip-flop U. Hunting of the call band to find a free call channel is thus resumed.

For a practically tested intercommunication system the following specific data may be given:

Code transmission speed: 2000 code elements per second.
Address length: 9 code elements.
Synchronizing word length: 9 code elements.
Frequency of hunting oscillator 21:20 c./s.
Transmission time of the station's own address (fly-back time of flip-flop W): 40 msec.
Transmission time of adjusted address: max. 10 seconds (delay time of the delay circuit D).
Number of intercommunication stations: 512.
Particular feature: each intercommunication station is capable of establishing a communication with any other station in its range without disturbing existing communications.

What is claimed is:

1. A transceiver comprising a receiver component and a transmitter component said receiver component comprising; means for scanning the reception frequency of said receiver; means coupled to said receiver for detecting a free call frequency; means for stopping said scanning when said free call frequency is located; means for tuning said receiver to a reply frequency corresponding to said call frequency distinct therefrom; means for resuming said scanning of said receiver until both a free call frequency and a free corresponding reply frequency are located; means for tuning said receiver to said free reply frequency having a corresponding free call frequency; a source of address signals corresponding to the station to be called; means for actuating said transmitter for transmitting said address signals on said free call frequency having a corresponding free reply frequency; means for detecting the transmission of said address signals from said called station; a source of information signals; means for coupling said information signals source to said transmitting means upon the detection of said address signals from said called station; means for detecting the transmission of an address signal corresponding to the present receiver; a source of address signals corresponding to the present receiver and means for coupling said present receiver address signals source to said transmitter for transmission upon the detection of said present receiver address signals.

2. A transceiver as claimed in claim 1 wherein said call frequency comprises a frequency located within a call band and said reply frequency comprises a frequency located within a reply band distinct from said call band.

3. A transceiver as claimed in claim 2 wherein each call frequency is at fixed frequency distance from the corresponding reply frequency, said fixed distance being the same for all call frequencies.

4. A transceiver as claimed in claim 1 further comprising means for tuning said transmitter to another free call frequency having a corresponding free reply frequency when no address signals are received from said called station.

5. A transceiver as claimed in claim 4 wherein transmitter tuning means starts from a selected call frequency and tunes in a selected order of succession.

6. A transceiver as claimed in claim 1 wherein said scanning means scans in discrete frequency steps.

7. A transceiver as claimed in claim 1 wherein, said address signals comprise binary signals.

8. A transceiver as claimed in claim 7 wherein said binary address signals include a synchronization portion.

9. A transceiver as claimed in claim 1 wherein said transmitting means comprises a sub-carrier oscillator for modulation by said address signals.

10. A transceiver as claimed in claim 1 wherein said transmitting means comprises a frequency modulator.

11. A transceiver as claimed in claim 1 wherein said receiver comprises a frequency discriminator.

12. A transceiver as claimed in claim 11 wherein said free frequency detecting means comprises means for detecting noise above the highest frequency of said information and address signals.

References Cited

UNITED STATES PATENTS

| | | | |
|---|---|---|---|
| 3,426,279 | 2/1969 | Berman | 343—179 |
| 3,443,228 | 5/1969 | Brenner et al. | 343—179 |

ROBERT L. GRIFFIN, Primary Examiner

A. J. MAYER, Assistant Examiner

U.S. Cl. X.R.

325—55, 57, 64; 343—179